United States Patent
Uchida et al.

(10) Patent No.: US 6,882,893 B2
(45) Date of Patent: Apr. 19, 2005

(54) METHOD OF DESIGNING PRODUCT USING 3-DIMENSIONAL MODEL

(75) Inventors: Takanao Uchida, Saitama (JP); Hiromi Shimada, Saitama (JP); Shigeru Nagai, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 294 days.

(21) Appl. No.: 10/088,103

(22) PCT Filed: May 22, 2001

(86) PCT No.: PCT/JP01/04253
§ 371 (c)(1),
(2), (4) Date: Mar. 22, 2002

(87) PCT Pub. No.: WO02/25503
PCT Pub. Date: Mar. 28, 2002

(65) Prior Publication Data
US 2002/0138167 A1 Sep. 26, 2002

(30) Foreign Application Priority Data
Sep. 19, 2000 (JP) .......................... 2000-283603

(51) Int. Cl.[7] .............................................. G06F 19/00
(52) U.S. Cl. .......................................... 700/98; 700/118
(58) Field of Search .......................... 700/97, 98, 103, 700/104, 109, 110, 118, 96, 95, 105, 119; 703/1

(56) References Cited
U.S. PATENT DOCUMENTS 5,900,880 A * 5/1999 Cline et al. .................. 345/423
5,923,836 A * 7/1999 Barch et al. .................. 714/33
6,110,216 A * 8/2000 Weber et al. .................. 703/8
6,230,066 B1 * 5/2001 Sferro et al. ................. 700/104
6,495,794 B1 * 12/2002 Shi ......................... 219/121.72
2001/0016803 A1 * 8/2001 Sartiono et al. ............... 703/1
2002/0100750 A1 * 8/2002 Shi ......................... 219/121.85
2002/0138237 A1 * 9/2002 Topholm ....................... 703/1

OTHER PUBLICATIONS

Patent Abstract of Japan Publication No. 2000-141509, Publication Date May 23, 2000.
Patent Abstract of Japan Publication No. 10-138310, Publication Date May 26, 1998.
Patent Abstract of Japan Publication No. 10-000627, Publication Date Jan. 6, 1998.

* cited by examiner

*Primary Examiner*—Albert W. Paladini
*Assistant Examiner*—Chad Rapp
(74) *Attorney, Agent, or Firm*—Arent Fox

(57) ABSTRACT

The present invention provides a design method, which makes the product development more efficient. The design is performed with the process including the following steps; a first step to prepare a three-dimensional CAM model S11, a second step to perform a CAE analysis for the three-dimensional CAM model S12, a third step to correct the three-dimensional CAM model on the basis of the CAE analysis if the defects exist S14, a fourth step to manufacture a mold on the basis of the three-dimensional CAM model S17, a fifth step to manufacture a trial product with the mold S18, a sixth step to test the trial product S19, a seventh step to correct the three-dimensional CAM model if the defects exist S21, an eighth step to iterate the fourth through seventh steps until the defects are solved (S21, S16 through S20), a ninth step to prepare the drawings on basis of the three-dimensional CAM model obtained at the eighth step S22.

12 Claims, 2 Drawing Sheets

METHOD OF DESIGNING PRODUCT USING 3-DIMENSIONAL MODEL

FIELD OF THE INVENTION

The present invention relates to a design method of a product with three-dimensional CAM (Computer Aided Manufacturing) model, which enables a reduction in man-hours associated with the product development.

BACKGROUND OF THE INVENTION

Generally speaking, a process is required to complete the design of a product, in which two-dimensional drawings are prepared and the manufacturing of a trial product with them and testing are performed to dig out its defects, followed by the update of the drawings for further maturity. However, as the iteration of trial requires a large amount of development time and trial cost, in recent years it has been tried to reduce the development time utilizing the analytical technique of CAE (Computer Aided Engineering).

The product design flow with the prior CAE analysis is described as follows. FIG. 2 is a figure showing the flow diagram for a product design with the prior CAE analysis.

A designer prepares two-dimensional layout drawings or a three-dimensional layout model with a CAD (Computer Aided Design) system (S100). Then, a three-dimensional rough model is prepared for each or some parts in the three-dimensional CAD system (S101), and a CAE analysis such as stress analysis etc. is performed for the rough model (S102).

As a result of the CAE analysis, if the defects such as the lack of product strength are found (S103), the layout will be corrected (S104). The two-dimensional drawings, on which the detail dimensions and process directions are shown, are prepared according to the corrected layout (S105), and a trial product is manufactured on the basis of the two-dimensional drawings. In the case of aluminum alloy casting parts, the trial manufacturing is generally conducted with a sand mold. A trial product of sand mold is made in the following steps: the manufacturing of a male wooden mold for sand mold (S106), the manufacturing of a female sand mold (S107), casting with the sand mold and finishing the product with machining (S108).

The trial product undergoes required tests (S109) and the two-dimensional drawings are corrected reflecting the test results.

If the trial product of sand mold is not ascertained to reach the expected product maturity level, the steps S105 through S109, from the trial manufacturing to the test with the trial product of sand mold, will be iterated. If it is judged that the trial product has the prospects of satisfying the expected product maturity level, the mass production with a metal mold will be started. For manufacturing the metal mold, a three-dimensional CAM model is prepared (S110), with which a three-dimensional metal mold model is prepared for the mold manufacturing (S111). The metal mold is manufactured with the three-dimensional metal mold model data (S112). The tests before the mass production are performed for the mass production confirmation product manufactured with the metal mold (S113), and if the defects are found out (S114), the two-dimensional drawings are again corrected (S115), and the three-dimensional CAM model is corrected accordingly (S116) to iterate the steps (S115, S116, S111 through S114) till the defects disappear. If no defects are found (S114), the mass production drawings will be prepared to start the mass production.

The rough model represents the final shape of product roughly, omitting small ribs, thinning, draft angles and fillets. It means that the three-dimensional model of the rough model cannot be applied to the machining data for the mold manufacturing. The reason why the rough model was used in the prior CAE analysis is that the CAM model, the data of which deserved to be applied to the machining data of the mold manufacturing, could not be brought into use in the actual development. It was extremely difficult to divide the CAM model into meshes due to its data size and fineness, and it took too much time to perform the stress calculation etc. even if the mesh dividing was performed successfully.

Metal molds are much more expensive than sand molds, and it will be a great waste when such changes come up later that require more than the mold correction. It is the reason why sand molds have been used for aluminum alloy casting parts.

However, the development flow with CAE analysis mentioned before was not efficient in the following points.

The rough model did not incorporate the detailed shape of product, not allowing checking the effects of reinforcement with fillets and ribs to end up with many unanticipated defects in the trial product of sand mold sometimes. Therefore, the test of the trial product of sand mold was liable to be delayed, and it required several times of the iteration depending on the degree of completion.

The product manufactured with a sand mold generally weighs 10% more than that with a metal mold. It is attributed to the fact that the product has to be made thicker because the sand mold is inferior to the metal mold in the accuracy of shape and is not able to withstand the pressure. Therefore, the product of sand mold tends to have excessive strength than that of metal mold. In other words, the strength of the product is liable to be insufficient when it is manufactured with a metal mold. Unanticipated defects happened to emerge in the stage of mass production confirmation, which led to the correction or re-manufacture of metal mold, caused the increase in the development period of time and cost.

Further, the manufacturing of a wooden mold required another three-dimensional CAM model or some other approaches, since the trial product of sand mold was manufactured with the two-dimensional drawings. It took as many as one man-month to produce the three-dimensional CAE model with the rough model for an expert on CAE.

The object of the present invention to solve the problems described above is to provide a new design method to improve the flow of a product development with three-dimensional CAM model.

SUMMARY OF THE INVENTION

The present invention to address the above issues according to the appended claim 1 provides a design method of a product with three-dimensional model, in which a three dimensional CAM model is prepared and a CAE analysis is performed for the three dimensional CAM model, and then the drawings of the product are prepared with the results of the CAE analysis.

Compared with the prior method which performed a CAE analysis for a rough model, which had a rather different shape from that of the product, according to claim 1 of the present invention, a CAE analysis is performed for the CAE model representing the product shape in detail and the drawings for the product are prepared on the basis of the results. As it makes possible to find errors in the design associated with strength and performance in advance of the trial manufacturing, the more matured design will be attainable. Therefore, the drawings for trial and mass production will be more matured, thereby leading to a reduction in the time period of testing and the labor costs for the development.

The three-dimensional CAM model is the detailed three-dimensional model representative of the final product shape. Also, the drawings of the product according to the appended claims include all the drawings prepared in the various phases of the product development irrespective of the trial or mass production phase.

According to the appended claim 2 there is provided a design method of a product with three-dimensional model, including a first step to prepare a three dimensional CAM model, a second step to perform a CAE analysis for the three dimensional CAM model, a third step to correct the three dimensional CAM model on the basis of the CAE analysis if the defects exist, a fourth step to manufacture a trial product on the basis of the three dimensional CAM model, a fifth step to test the trial product and a sixth step to prepare the drawings on the basis of the results of the test.

According to the appended claim 3 there is provided a design method of a product with three-dimensional model, including a first step to prepare a three dimensional CAM model, a second step to perform CAE analysis for the three dimensional CAM model, a third step to correct the three dimensional CAM model on the basis of the CAE analysis if the defects exist, a fourth step to manufacture a trial product on the basis of the three dimensional CAM model, a fifth step to test the trial product, a sixth step to correct the three dimensional CAM model on the basis of the results of the test if the defects exist, a seventh step to iterate the fourth through sixth steps until the defects are solved and an eighth step to prepare the drawings on basis of the three dimensional CAM model obtained at the seventh step.

In this method, a rough model dedicated to the use for CAE analysis is not requested, since the CAE analysis is performed for the three dimensional CAE model, which is applicable to the data for manufacturing the trial product. Because the three dimensional CAM model is prepared at the beginning of trial manufacturing, the man-hour of manufacturing can be reduced by utilizing it for the trial manufacturing, and also the man-hour of test is decreased by performing the test with the trial product closer to the final mass production product.

DESCRIPTION OF THE PREFERRED EMBODIMENTS

The preferred embodiment of the present invention will now be described in detail below.

Figure 1:
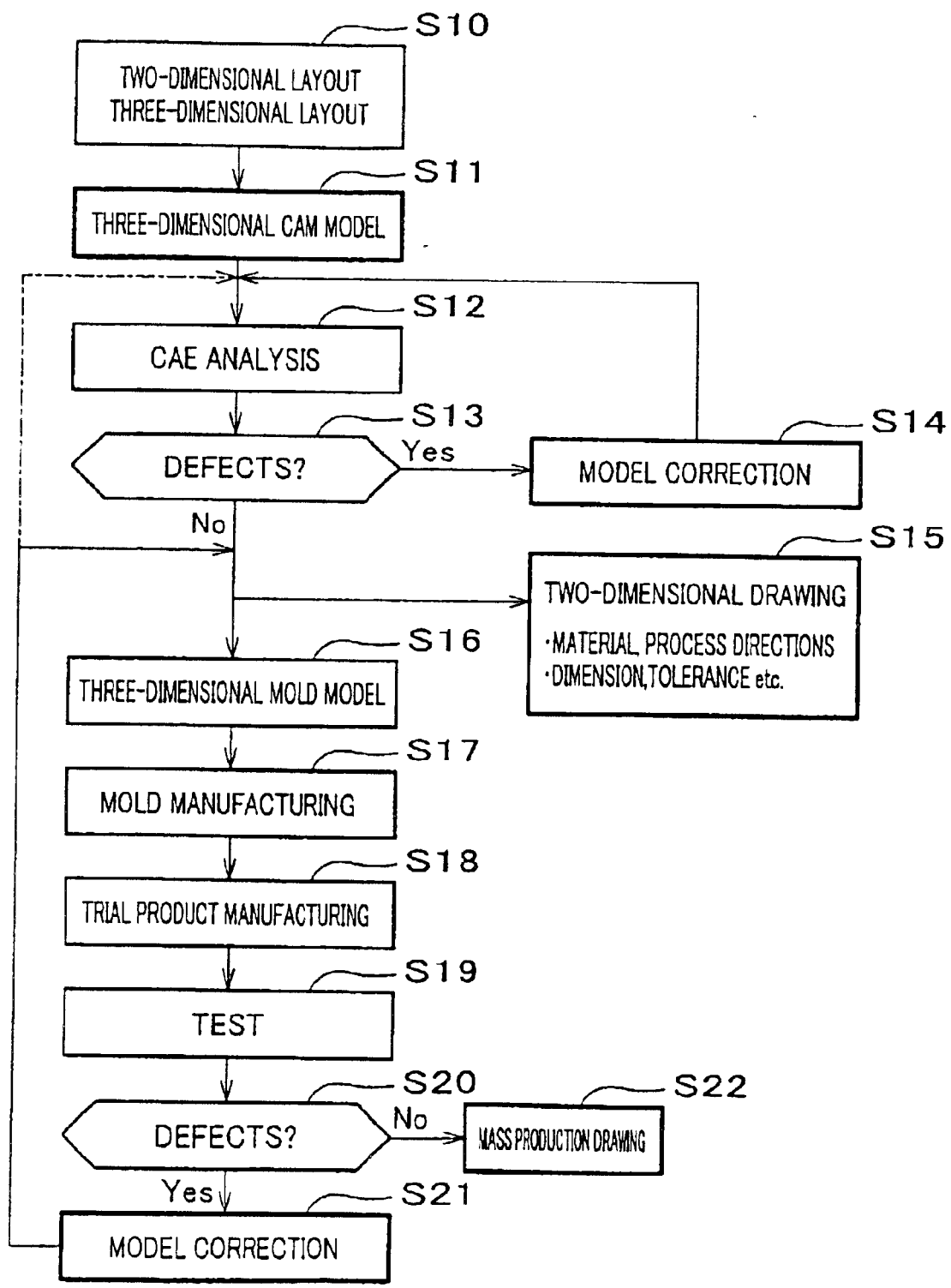
FIG. 1 is a figure showing the flow diagram of a design method of a product with three-dimensional model according to the present invention.
Figure 2:
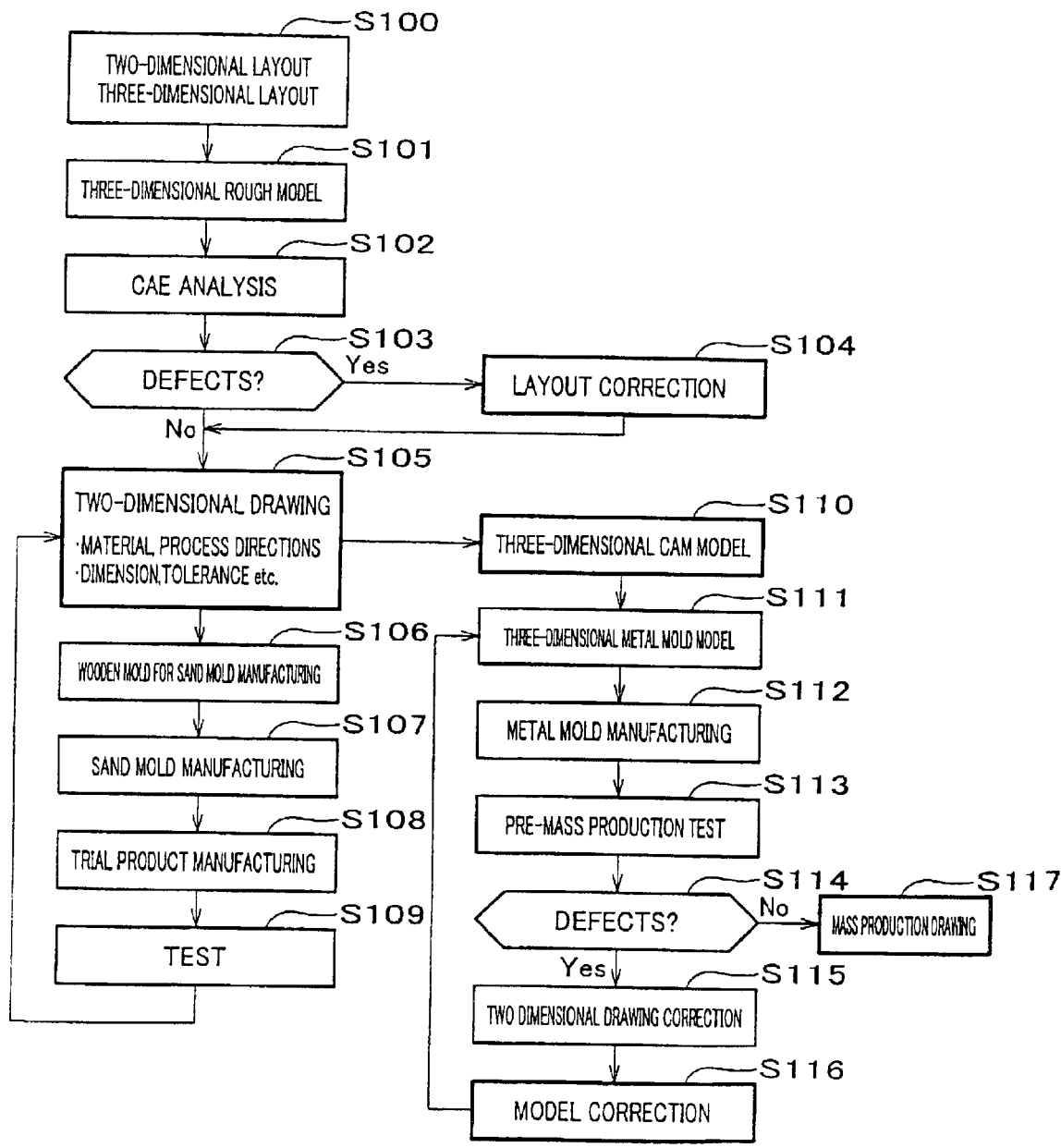
FIG. 2 shows a figure showing the flow diagram of a design method of a product with CAE analysis according to the prior art.

FIG. 1 is a flow diagram describing a design method of a product with three-dimensional model.

A designer prepares two-dimensional layout drawings or a three dimensional layout model with a three-dimensional CAD system (S10). He then makes a three dimensional CAM model for each part or some parts in the three-dimensional CAD system (S11) and performs the CAE analysis for it (S12). The stress analysis for the three dimensional CAM model is conveniently performed in the three-dimensional CAD system, which has been developed recently. An expert on CAE analysis used to prepare a meshed model appropriate for the shape of each part and perform the calculation and post-calculation displaying process. Now dividing a complex shape like a three-dimensional CAM model into meshes, the calculation and the post-calculation displaying process can be performed automatically. Therefore, an expert is not necessarily required and a designer can do by himself these operations associated with the stress analysis for a three-dimensional CAM model instead.

The three dimensional model is corrected with the results of the CAE analysis if the defects such as lack of strength are found out, and the CAE analysis is iterated (S14). If the defects are solved, two-dimensional drawings are prepared on the basis of the three dimensional CAM model (S15). The two-dimensional drawings, on which material, dimension, tolerance, surface roughness and the allowable level of a product are specified, are used as the documents for the order of trial manufacturing.

A three-dimensional mold model incorporating the contraction ratio of material and the machining allowance is prepared as the data for manufacturing a trial product, utilizing the three dimensional CAM model prepared previously (S16). A trial mold such as sand mold is produced on the basis of the three-dimensional mold model (S17) and the trial product is manufactured with the mold.

The trial mold is not limited to a sand mold, and a plaster or metal mold may be an alternative. When the product is not complex and its prospects are attainable by the CAE analysis so long as the strength can be verified by the trial product, a metal mold to be usable for the mass production would be preferable. Using the metal mold will make the most of the benefits brought about by the CAE analysis with the CAM model, thus achieving a remarkable reduction in the development period of time.

Next, required product tests are performed for the trial prodpct (S19) and its defects are investigated. If any defects are found out (S20), the three-dimensional CAM model is corrected, the two-dimensional drawings and the three-dimensional mold model are also corrected, and the steps (S21, S15 through S20) are iterated, which are for remaking and testing a new trial product. If another examination with the CAE analysis is considered to be necessary, the steps (S21, S12 through S20), checking with the CAE analysis, the correction of the two-dimensional drawings and the three-dimensional mold model, and the production of a trial product, may be iterated. In the second or subsequent trial, a trial with a metal mold will be conducted if the design is judged to be matured on the basis of the preceding test results. The development comes to an end if all the defects of trial product are solved and the drawings for mass production according to the appended claims are prepared on the basis of the three-dimensional CAM model (S22).

The above steps will complete the design of a product.

According to the embodiment of the invention, a three-dimensional CAE model based on a rough three-dimensional model can be deleted, which was required in the prior art. Because the step of the rough three-dimensional model of the prior art is replaced with the step of the three-dimensional CAM model of the present invention, it leads to a reduction in the steps, since a three-dimensional CAM model was also required for manufacturing a metal mold in the prior arts.

In the CAE analysis with the three-dimensional rough model, in which the shape of the product in detail was not modeled, a designer depended on the intuition and experience for the shapes of ribs and pads. With the method according to the invention, he can design the optimum shape, since he performs the CAE analysis for the three-dimensional CAM model, in which the detailed shape is modeled. Therefore, excessive padding is no more required, which will lead to a reduction in weight and accordingly a reduction in the cost of the product.

Further, the trial product made with the three-dimensional CAM model, even if it is produced with a sand mold, will be close to a product of metal mold. So the number of checking of the product of metal mold will be reduced to about one, since the difference between the trial product and the product of metal mold is small. Therefore, it will prevent the delay of development due to the unanticipated defects during the checking of the product of metal mold.

It will now be appreciated from the foregoing description that the present invention is not limited to the particularly illustrated embodiment discussed above and may be carried out in various modified forms.

For example, though the stress analysis has been mentioned as the CAE analysis in the above description according to the embodiment of the invention, it is not limited to the stress analysis but all the CAE analyses are available, such as the port flow analysis, thermal conduction analysis and combustion analysis, which are necessary to investigate the performance of the product in manufacturing.

The design method of a product according to the invention may include other steps as long as the steps according to the appended claims are included. For example, the step of CAE analysis after the CAM model correction may be iterated depending on the results of the CAE analysis until the shape of the product reaches the considerably matured level.

Further, the present invention is not limited to the particularly illustrated embodiment of the design method of product discussed above, whose trial and mass production employ molds, but it may be carried out in various modified forms for general products. Because the three-dimensional CAE analysis with three-dimensional CAM model provides the performance of a product in detail, it will be possible to manufacture a highly matured trial product. Therefore, the test of the trial product and the redoing of the trial are reduced, which will lead to a reduction in the development man-hour. Especially when the three-dimensional CAM model data can be used in the trial and mass production phases, it will be possible to reduce the development man-hour remarkably, since the efficiency of production process can also be improved. As an example of this, the development of resin parts is given, in which the NC machining data created from the three-dimensional CAM model is used for the trial and the metal mold is used for the mass production. The present invention will give significant effects for the product as described before, which employs molds for both trial and mass production, especially the product using sand molds for the trial production.

INDUSTRIAL APPLICABILITY

The invention will dispense with the prior process of calculation with the three-dimensional rough model after the preparation of the two-dimensional drawings, enabling a reduction not only in the time period and man-hour of product design but also in the cost.

In the prior arts, the trial product of sand mold was manufactured with the two-dimensional drawings, which were modified with the results of three-dimensional CAE analysis for the three-dimensional rough model. The invention allows the trial production on the basis of the CAE analysis results with the three-dimensional CAM model, thereby upgrading the maturity of the trial with a sand mold and reducing the time period of trial product testing.

Further, the invention permits refining of the rib shape and padding with the CAE analysis, which in the prior arts has left much to be handled by the intuition and experience. Therefore, it will allow designing an optimum shape, thereby enabling the lightweight product and a reduction in the cost.

In the present invention, metal molds can be introduced in the first trial production depending on the product, since the initial design reaches high maturity with the CAE analysis, in which the detailed shape is reflected. Therefore, it will attain more accurate and detailed test results of trial production, thereby reducing the development period of time and the cost.

What is claimed is:

1. A design method of a product with three-dimensional model, wherein:

a three-dimensional CAM model is prepared, a CAE analysis is performed for said three-dimensional CAM model, and then drawings of the product are prepared with results of said CAE analysis, wherein the three-dimensional CAM model is divided into a plurality of meshes, the CAE analysis calculation, and a post-calculation display process are performed automatically.

2. The design method according to claim 1, wherein the CAE analysis is performed in a three-dimensional CAD system.

3. The design method according to claim 1, wherein the CAE analysis is one of a stress analysis, port flow analysis, thermal conduction analysis, and combustion analysis.

4. A design method of a product with three-dimensional model, comprising:

(1) a first step to prepare a three-dimensional CAM model;

(2) a second step to perform a CAE analysis for said three-dimensional CAM model;

(3) a third step to correct said three-dimensional CAM model on the basis of said CAE analysis if defects exists;

(4) a fourth step to manufacture a trial product on the basis of said three-dimensional CAM model;

(5) a fifth step to test said trial product; and (6) a sixth step to prepare drawings on the basis of results of said test, wherein the three-dimensional CAM model is divided into a plurality of meshes, the CAE analysis calculation, and a post-calculation display process are performed automatically.

5. The design method according to claim 4, wherein the CAE analysis is performed in a three-dimensional CAD system.

6. The design method according to claim 4, wherein the CAE analysis is one of a stress analysis, port flow analysis, thermal conduction analysis, and combustion analysis.

7. A design method of a product with three-dimensional model, comprising:

(1) a first step to prepare a three-dimensional CAM model;

(2) a second step to perform a CAE analysis for said three-dimensional CAM model;

(3) a third step to correct said three-dimensional CAM model on the basis of said CAE analysis if defects exist;

(4) a fourth step to manufacture a trial product on the basis of said three-dimensional CAM model;

(5) a fifth step to test said trial product;

(6) a sixth step to correct said three-dimensional CAM model on the basis of results of said test if the defects exist;

(7) a seventh step to iterate said fourth through sixth steps until the defects are solved; and (8) an eighth step to prepare drawings on the basis of the three-dimensional CAM model obtained at said seventh step, wherein the three-dimensional CAM model is divided into a plurality of meshes, the CAE analysis calculation, and a post-calculation display process are performed automatically.

8. The design method according to claim 7, wherein the CAE analysis is performed in a three-dimensional CAD system.

9. The design method according to claim 7, wherein the CAE analysis is one of a stress analysis, port flow analysis, thermal conduction analysis, and combustion analysis.

10. A design method of a product with a three-dimensional model, wherein;

a three-dimensional CAM model, which is a detailed three-dimensional model representative of a final shape of the product, is prepared;

a CAE analysis is performed for said three-dimensional CAM model; and drawings of the product are prepared with results from said CAE analysis, wherein the three-dimensional CAM model is divided into a plurality of meshes, the CAE analysis calculation, and a post-calculation display process are performed automatically.

11. A design method of a product with a three-dimensional model, comprising the following steps of:

(1) preparing a three-dimensional CAM model, which is a detailed three-dimensional model representative of a final shape of the product;

(2) performing a CAE analysis for said three-dimensional CAM model;

(3) correcting said three-dimensional CAM model based on said CAE analysis if a defect exists;

(4) manufacturing a trial product based on said three-dimensional CAM model;

(5) testing said trial product; and (6) preparing drawings based on results of said testing, wherein the three-dimensional CAM model is divided into a plurality of meshes, the CAE analysis calculation, and a cost-calculation display process are performed automatically.

12. A design method of a product with a three-dimensional model, comprising the following steps of:

(1) preparing a three-dimensional CAM model, which is a detailed three-dimensional model representative of a final shape of the product;

(2) performing a CAE analysis of said three-dimensional CAM model;

(3) correcting said three-dimensional CAM model based on said CAE analysis if defects exist;

(4) manufacturing a trial product based on said three-dimensional CAM model;

(5) testing said trial product;

(6) correcting said three-dimensional CAM model based on results of said testing if the defects exist;

(7) repeating steps (4) through (6) until the defects are solved; and (8) preparing drawings based on said three-dimensional CAM model obtained during step (7), wherein the three-dimensional CAM model is divided into a plurality of meshes, the CAE analysis calculation, and a post-calculation display process are performed.

* * * * *